Feb. 3, 1970    R. D. RUMSEY    3,493,067
DIRECT DRIVE WHEEL MOUNT
Filed Sept. 15, 1967    7 Sheets-Sheet 1
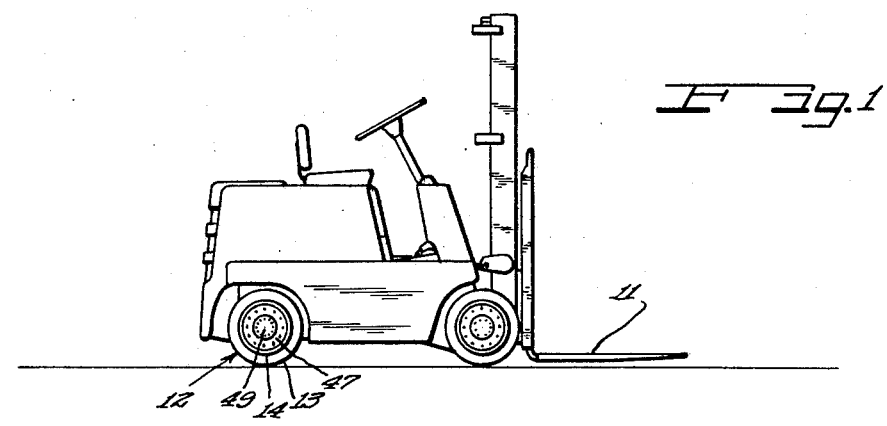
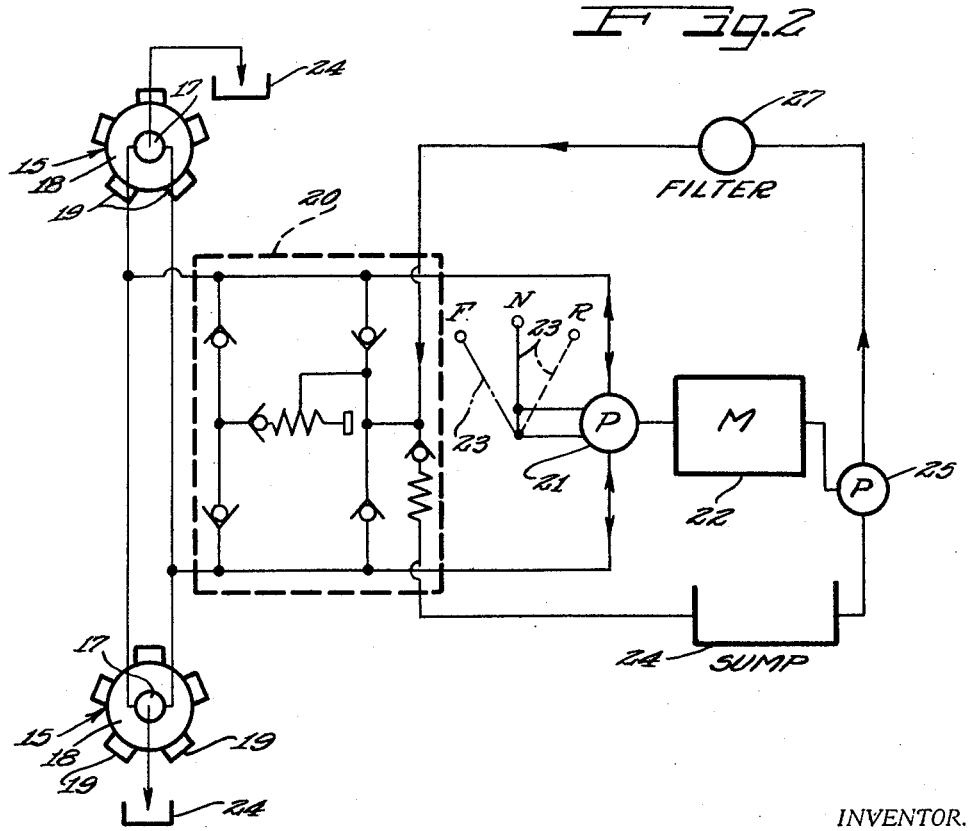
INVENTOR.
Rollin Douglas Rumsey
BY Hill, Sherman, Meroni, Gross & Simpson    ATTORNEYS

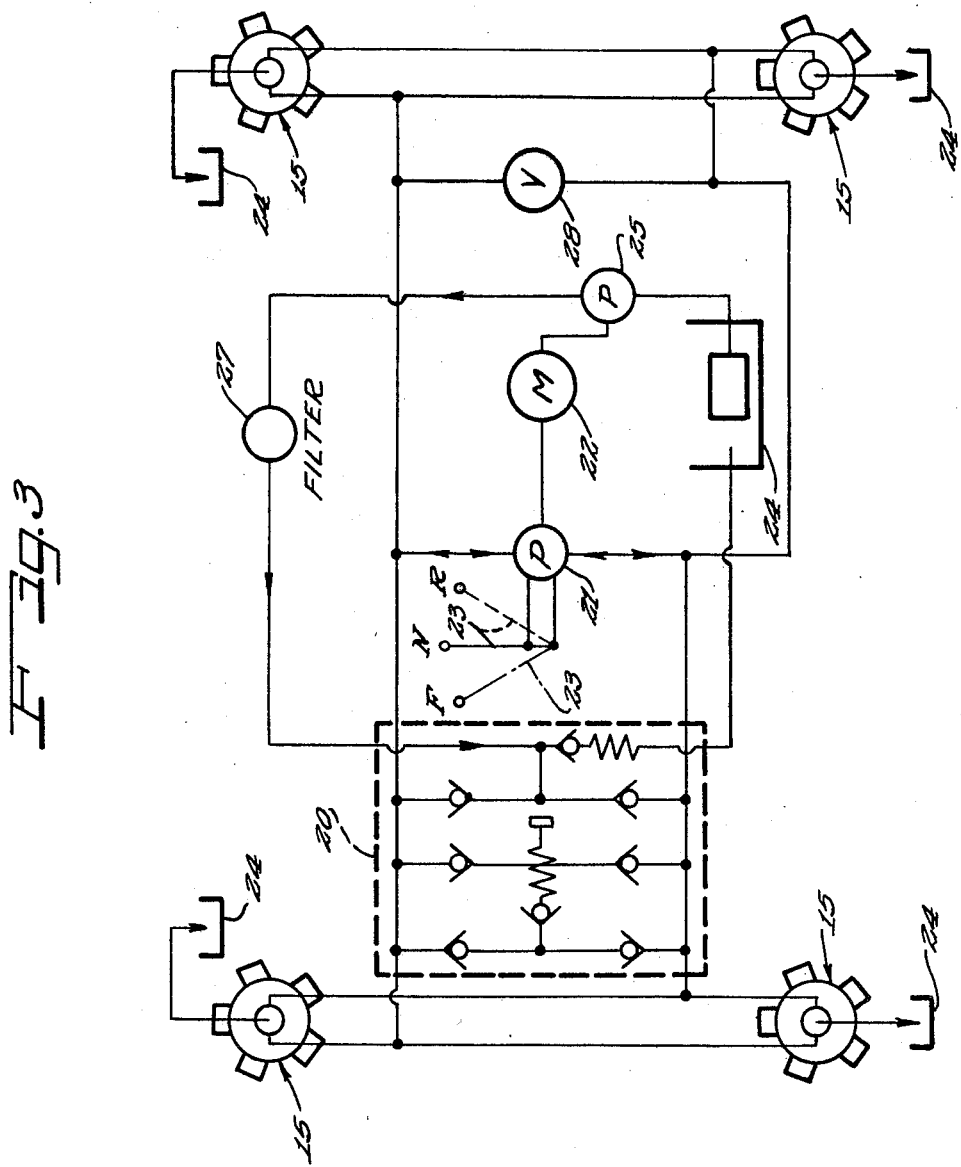

Feb. 3, 1970  R. D. RUMSEY  3,493,067
DIRECT DRIVE WHEEL MOUNT
Filed Sept. 15, 1967  7 Sheets-Sheet 3

INVENTOR.
Rollin Douglas Rumsey
BY  ATTORNEYS

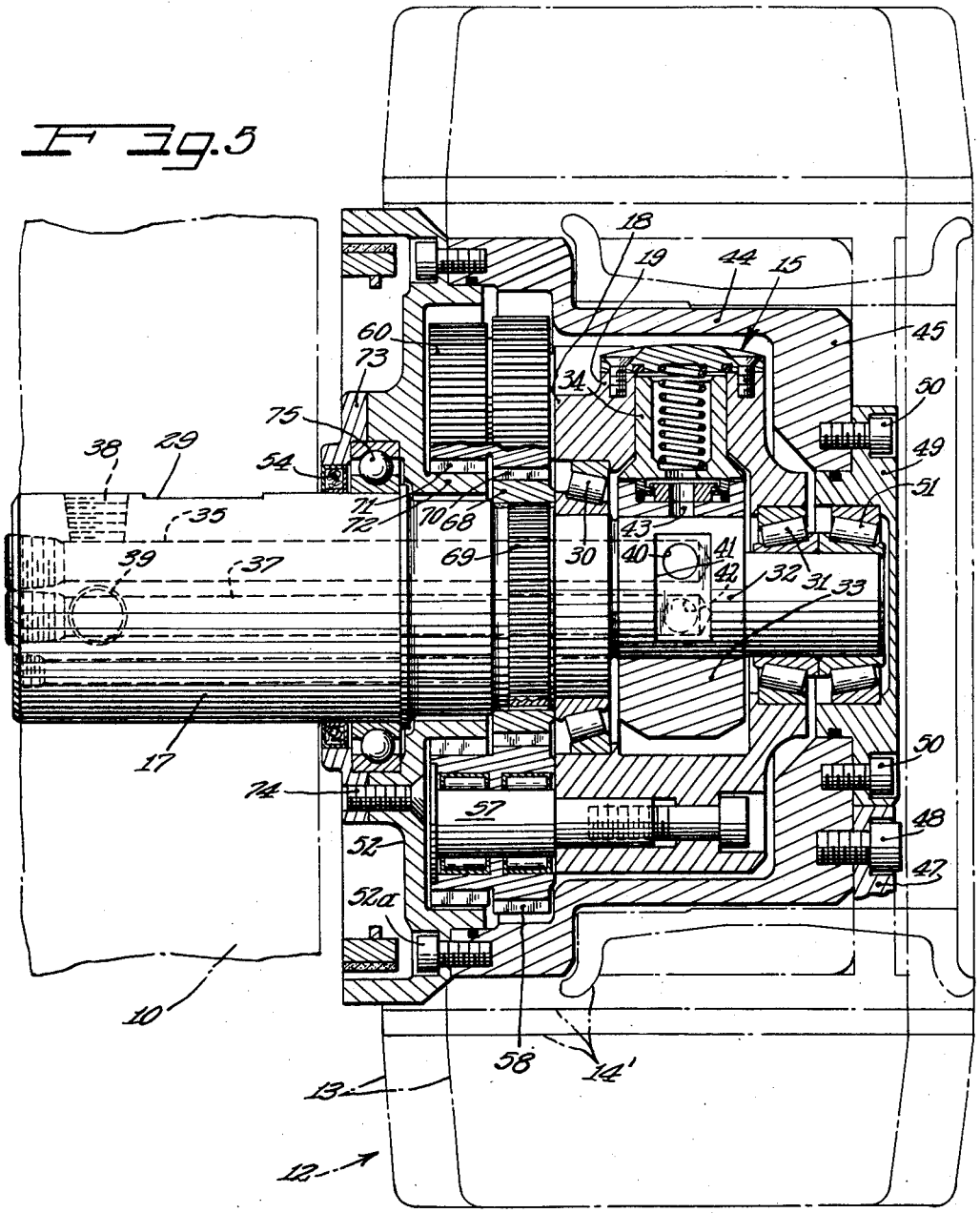

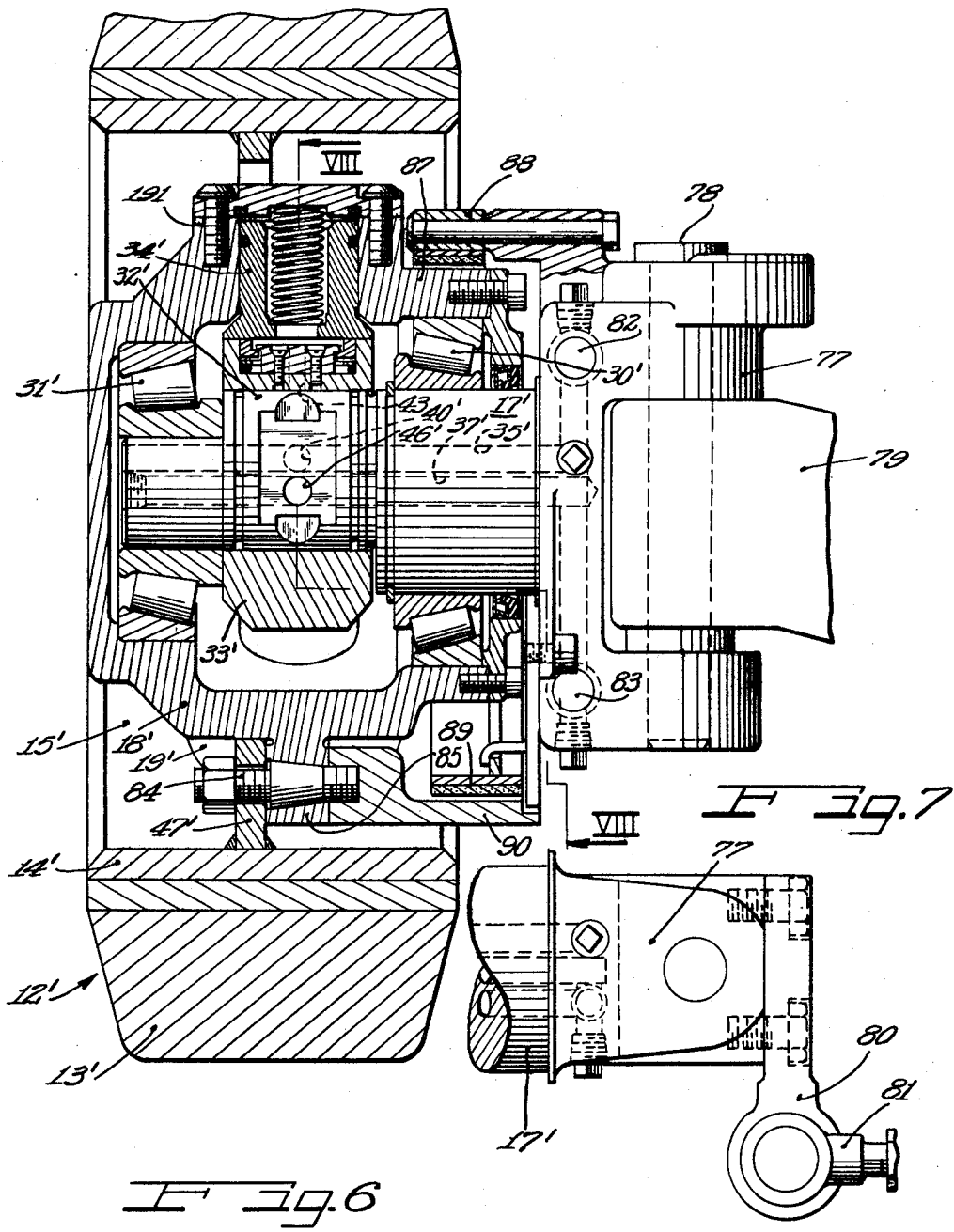

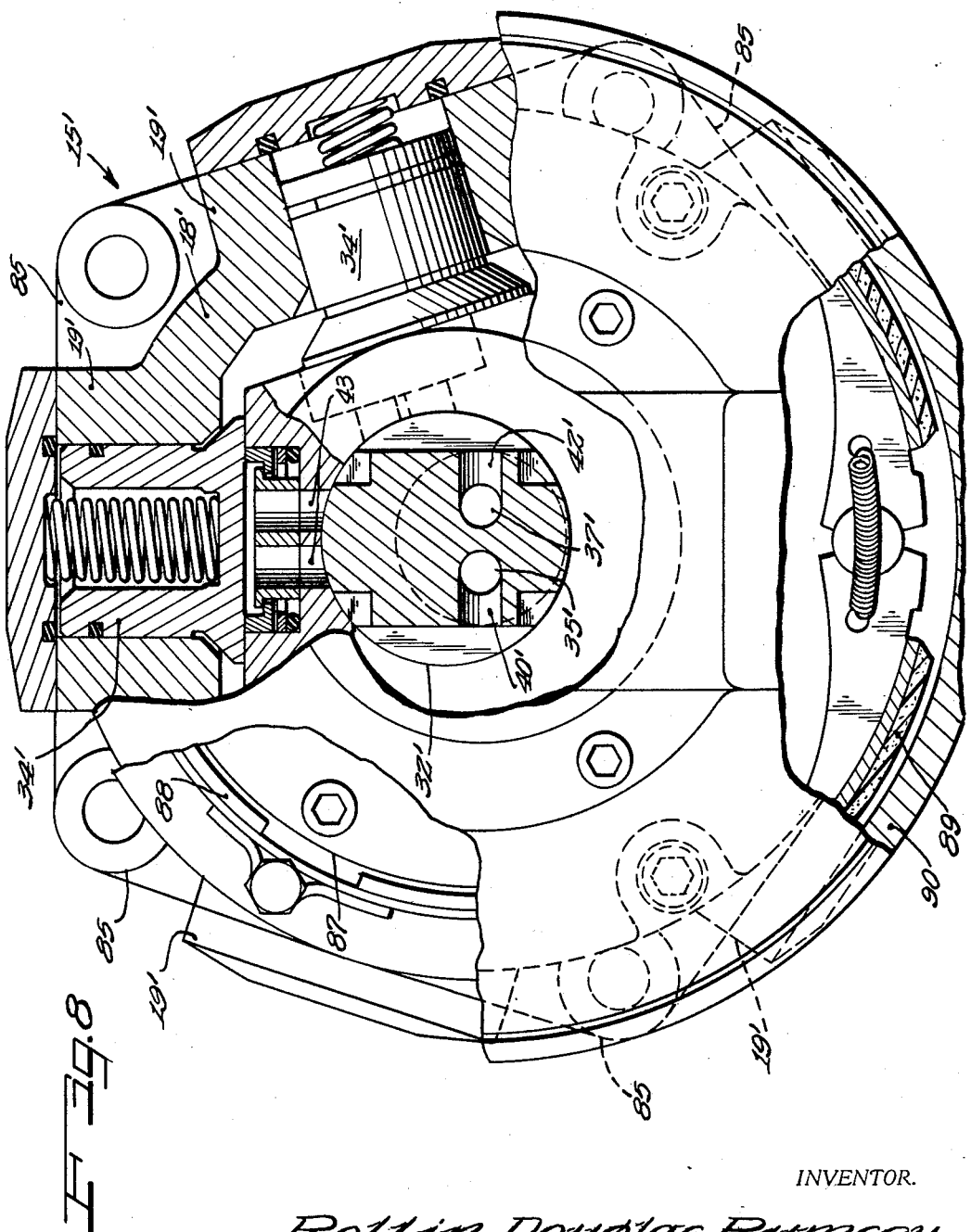

United States Patent Office 3,493,067
Patented Feb. 3, 1970

3,493,067
DIRECT DRIVE WHEEL MOUNT
Rollin Douglas Rumsey, Buffalo, N.Y., assignor to Houdaille Industries, Inc., Buffalo, N.Y., a corporation of Michigan
Filed Sept. 15, 1967, Ser. No. 667,959
Int. Cl. B60k *1/00, 3/00;* F16d *31/06*
U.S. Cl. 180—55                                    4 Claims

ABSTRACT OF THE DISCLOSURE

A combination wheel axle and motor shaft is journalled through a housing which is rotatable thereabout and having radial cylinders with hydraulically driven pistons reciprocable therein and operating against a bearing block mounted on an eccentric on the shaft to drive the housing and thereby a wheel which is mounted about the housing. In certain arrangements the wheel is driven at a differential speed relative to the housing by planetary gearing. In another arrangement the wheel is supported directly on and corotative with the housing. Mechanical braking means operate either on the housing or on the wheel support.

---

This invention relates to direct drive vehicle wheel mounts and more particularly concerns hydraulically driven wheels such as are especially useful for industrial lift trucks and the like.

Heretofore hydraulic motor driving of vehicle wheels has been through high speed hydraulic motor units with multi-stage reduction in order to achieve the required torque within the available space. Such arrangements have therefore generally employed a very small motor turning at extremely high speeds and resulting in insufficient hydraulic motor life in relation to the life of the vehicle.

It is, accordingly, an important object of the present invention to provide a hydraulic motor driven individual wheel mount arrangement which will provide adequate torque, speed of operation and braking capabilities within the confines of a wheel rim, and especially relatively small diameter wheel rims such as are employed on lift trucks.

Another object of the invention is to provide a new and improved hydraulic wheel drive which will provide a wide range of operating speeds and torque capability for running and load requirements of the vehicle to which applied.

A further object of the invention is to provide a new and improved hydraulic motor direct drive vehicle wheel mount which affords substantial advantages in ease of tread width adaptability.

Still another object of the invention is to provide a new and improved direct drive vehicle wheel mount in which dynamic braking eliminates service brake requirements of prior constructions so that only simple mechanical emergency brake means will suffice if deemed necessary.

Yet another object of the invention is to provide a new and improved hydraulic direct drive vehicle mount which utilizes the maximum displacement hydraulic motor capable of fitting within available space in an associated wheel while at the same time utilizing the lowest reduction ratio compatible therewith in a single stage, planetary gear train.

A still further object of the invention is to provide a novel direct hydraulic vehicle wheel drive mount which is adapted for handling as a unit enabling ready assembling and removal relative to a vehicle.

A yet further object of the invention is to provide a unitary hydraulic motor and wheel mount operating about a stationary shaft and in which the rotating elements are automatically counterbalanced so that counterweighting problems are eliminated.

Other objects, features and advantages of the present invention will be readily apparent from the following detailed description of certain preferred embodiments thereof taken in conjunction with the accompanying drawings, in which:

FIGURE 1 is a side elevational view of a typical lift truck having wheels embodying features according to the principles of the present invention;

FIGURE 2 is a schematic hydraulic system diagram for controlling operation of two individual hydraulic motor wheel mounts for a vehicle;

FIGURE 3 is a similar schematic hydraulic system diagram for a four wheel drive according to the invention;

FIGURE 5 is a similar sectional detail view showing a modification;

FIGURE 6 is a similar sectional detail view showing a further modification and adaptation thereof for a steerable wheel;

FIGURE 7 is a fragmentary top plan view of the steering knuckle of FIGURE 6;

FIGURE 8 is a fragmentary sectional elevational view taken substantially along the irregular section line VIII—VIII of FIGURE 6;

Figure 4:
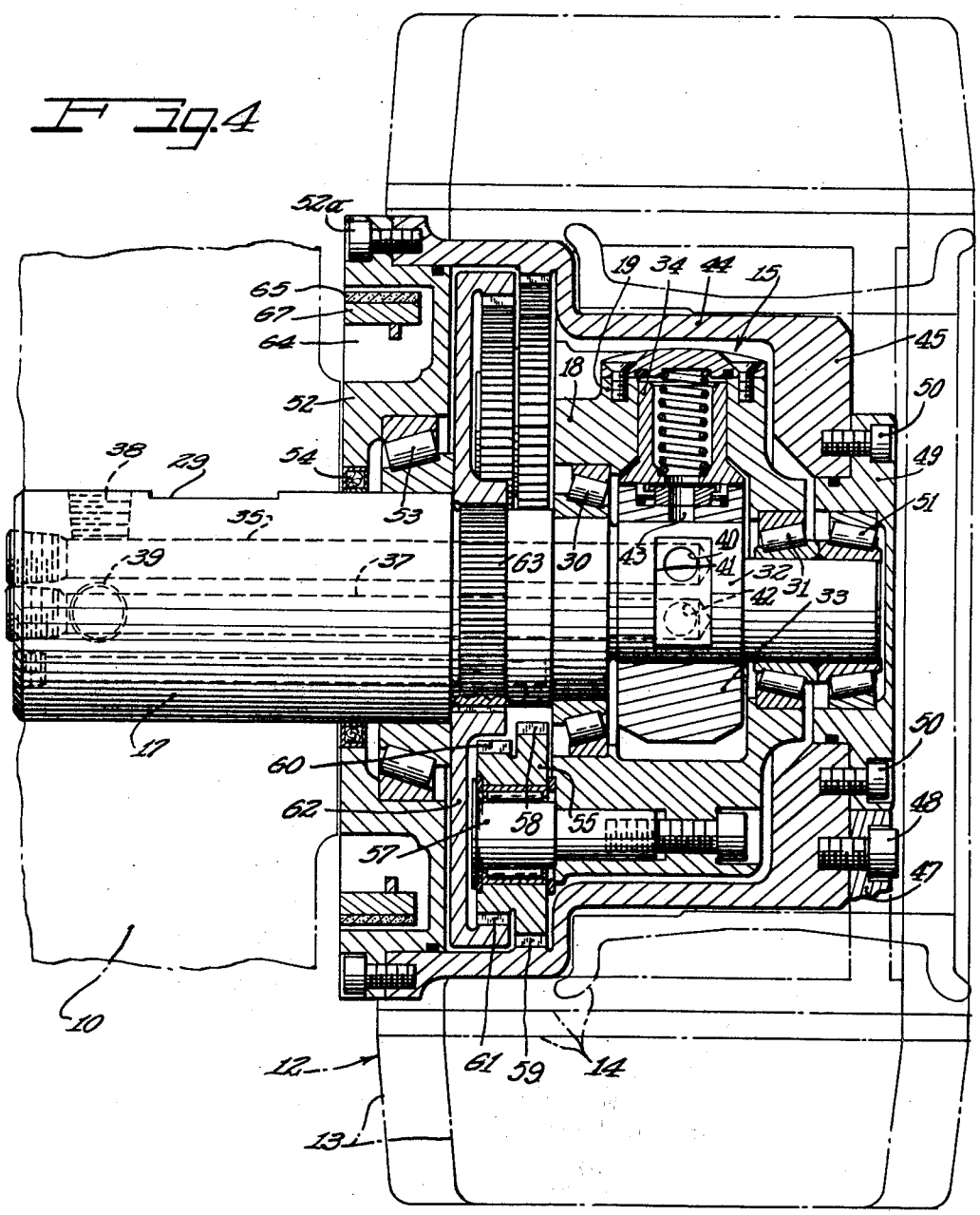
FIGURE 4 is an enlarged longitudinal vertical sectional detail view through the wheel mount of one of the vehicle wheels.

According to the principles of the present invention a direct drive wheel mount has a hydraulic motor which comprises a shaft and a housing thereabout with means coactive with the housing and the shaft for relatively rotatably driving the shaft and housing and so constructed and related to the associated wheel as to be received within the wheel rim. More particularly, means are provided for rotatably supporting the wheel coaxially relative to the shaft and about at least a portion of the housing, and means are operative in the relative rotation of the shaft and the housing to transmit driving power from the motor to drive the wheel supporting means and the wheel rotatably at a differential speed relative to the shaft and the housing. Further, in all embodiments of the invention herein disclosed the shaft serves also as the axle for the wheel, being for this purpose arranged to be fixedly and non-rotatably attached to the associated vehicle and more particularly the vehicle frame.

By way of example of a practical use of directly driven wheels according to the present invention, a vehicle 10 is shown in FIGURE 1 which comprises a fork lift truck having on the front thereof a load lifting fork 11. Mobile support for the vehicle 10 is by means of wheels 12 having tires 13 mounted on rims 14. Propulsion of vehicles of this type is generally by means of electric motors carried thereby, and sometimes by means of internal combustion motors which have heretofore generally been mounted on the vehicle body or carriage and drivingly connected with the wheels, or some of them, by transmission means such as gearing chains, and the like.

According to the present invention, some, or all, of the wheels 12 are directly driven by means of respective hydraulic motors 15 (FIGS. 2, 3 and 4). Each of the motors comprises a shaft 17 having a housing 18 thereabout and means comprising radial hydraulically actuated pistons in cylinders 19 relatively rotatably driving the shaft and housing. In the schematic of FIGURE 2 a hydraulic system for operating two driven wheels of the vehicle is shown wherein both of the individual driving motors 15 of the wheels are hydraulically connected through a relief and check valve assembly with a hydraulic pump 21 driven by a motor 22 and having a control device 23 to effect a forward driving, a reverse driving and a neutral setting for the pump. Spent fluid and leakage drain-off from the motors 15 returns to a sump 24 with which is connected a pump 25, also driven by the motor 22, which circulates the hydraulic fluid through a filter 27 and supplies it to the wheel motor driving system, as shown. In a four wheel drive as shown in FIGURE 3, substantially the same hydraulic motor driving system is provided for the motors 15 for all of the wheels of the vehicle, and in addition a valve 28 is provided in the system which is opened when the vehicle is to be towed with the hydraulic fluid pressurizing motor 22 shut down.

In the various embodiments of the invention as disclosed herein, the shaft 17 is constructed sufficiently large to withstand all wheel loads, and more particularly wheel loads of large magnitude.

Particularly, the hydraulic wheel mount is utilized in the running gear of a fork lift truck on the order of the vehicle 10 which is desired to lift and carry relatively heavy loads. Further, the motor housing is so constructed and arranged that it provides a closed unit within which the operating parts are thoroughly protected against dirt, dust or other foreign materials normally encountered in operation of the vehicle.

On reference to FIGURE 4 one of the wheels 12 equipped with the self-contained motor 15 encompassed within any selected or preferred form of the tire rim 14 adapted for either a pneumatic or a so-called cushion tire is depicted. In this instance the shaft 17 is constructed and arranged to serve not only as the motor shaft, but also as the axle for the wheel with its butt end portion of maximum diameter and provided with suitable means such as one or more peripheral flats 29 by which it is adapted to be keyed or locked non-rotatably into the running gear supporting frame of the vehicle 10. Intermediate the ends of the shaft, the housing 18 is mounted rotatably on the shaft by means of axially spaced respective sets of anti-friction, and in this instance roller bearings 30 and 31. Between the bearings, the shaft has an eccentric 32 about which is mounted a follower bearing block 33 which is desirably of pentagonal outline pursuant to the teachings of Kimsey Patent 3,036,557. Operatively thrusting slidably against the peripheral faces of the bearing block 33 are respective driving pistons 34 which are reciprocably operable in the cylinders 19, Hydraulic fluid for driving the pistons 34 is supplied to or exhausted from the pistons selectively through respective parallel ducts 35 and 37 extending longitudinally from the inner end of the shaft where they are respectively connected through ports 38 and 39 in the shaft with the hydraulic control system of FIGURE 2 or 3, as the case may be. From the duct 35 a lateral port 40 opens from the duct 35 into a flat 41 in the periphery of the eccentric 32, and a similar port 42 opens from the duct 37 into a similar flat on the opposite side of the periphery of the eccentric 32, whereby in the rotation of the eccentric within the bearing block 33 the eccentric flats successively register with respective ports 43 in the bearing block and through the bearing faces to charge and exhaust the pistons 34 in the operation of the motor, as taught in the Kimsey patent whereby to drive the housing 18 rotatably about the shaft.

In order to provide an advantageous torque relationship between the motor and the wheel, means are desirably provided to mount the wheel rotatably on the shaft 17 and to drive the wheel at a differential speed relative to the motor 15. To this end an annular flanged axially extending hollow wheel mounting member 44 is provided of an inside diameter of sufficient size to receive the housing 18 freely therein and of an outside diameter to be received in encompassing relation within any of the selected tire rims 14. For removable attachment of the respective tire rim thereto, the member 44 has on its outer end a radially inwardly extending annular flange 45 of substantial thickness to which radially inwardly extending attachment lug structure 47 of the selected tire rim is attached as by means of screws 48. Through the flange 45, the member 44 is rotatably mounted on the outer end portion of the shaft 17, conveniently by means of a bearing seat flange and closure cap 49 which is telescoped within the bore of the flange 45 and removably secured to as by means of screws 50 and encloses a roller bearing 51 engaged on the shaft. At its inner end, the member 44 has telescopically assembled therewith a combination bearing seat and closure flange 52 attached thereto removably as by means of screws 52a and enclosing a roller bearing assembly 53 engaged upon the shaft 17, with a dust seal 54 mounted between the shaft and the inner edge of the member 52. Through this arrangement, the wheel supporting member 44 is mounted rotatably in balanced relation on the shaft 17 and provides a protective enclosure for the motor 15 and all of the bearings and operative parts associated with the motor and the wheel supporting member.

Transmission means for connecting the motor 15 drivingly with the wheel supporting member 44 desirably comprise a planet gear system which for the relatively high torque, heavy load operation of a fork lift truck wheel provides a ratio on the order of 6:1 reduction. Such a planetary gearing comprises a suitable set, such as five planet spur gears 55 which are suitably mounted in anti-friction relation on stub axles 57 mounted on and to project from the inner face of the motor housing 18. Each of the planet gears 55 is provided with two differential sets of gear teeth comprising a larger diameter set 58 which meshes operatively with an internal gear 59 fixed on the wheel supporting member 44 and a smaller diameter set of teeth 60 which mesh operatively with a set of internal gear teeth 61 fixed on the outer perimeter of a sun gear member 62 which is keyed to the shaft 17 as by means of splines 63 and is thereby held stationary with the shaft. As a result, as the motor housing 18 is rotatably driven about the shaft 17, the planetary gearing transmission rotatably drives the wheel supporting member 44 relative to the shaft 17 and to the housing 18 in the desired gear reduction ratio. An advantage of the internal gear arrangement is that their relatively large diameter affords a low tooth load which efficiently absorbs the highest loadings which occur at low speeds.

While the hydraulic motor itself affords dynamic braking control, using the hydraulic motor in effect as a pump, and thus eliminating any need for service brakes, it is desirable to provide parking or emergency brake means for use when the hydraulic system is shut down. For this purpose the inner end closure and bearing mount member 51 is desirably provided with an annular axially inwardly opening recess 64 defined on one diameter by a brake drum surface 65 with which an expanding mechanical friction brake 67 is cooperable. Any suitable means for operating the brake 67 may be provided mounted on and operated from the vehicle 10, the running gear frame for which is close to the operating position for the brake.

In FIGURE 5 all of the several cooperating and operative parts of the hydraulic motor and the wheel and the wheel supporting means are substantially the same as in FIGURE 4 and corresponding parts are identically numbered and the same description will be understood to apply. However, in this form the planetary gearing transmission is modified to the extent that an annular sun gear 68 is fixedly mounted on the shaft 17 through the medium of splines 69 and has outer peripheral gear teeth 70 which mesh operatively with the larger diameter planet spur gear teeth 58, and the smaller diameter spur gear teeth 60 mesh operatively with fixed external gear teeth 71 on a flange 72 projecting axially inwardly on the inner perimeter of the end closure member 51. To accommodate this arrangement, the end closure member is provided with an annular retainer flange 73 which is removably attached thereto as by means of screws 74 and cooperates with the end member in enclosing and retaining a bearing assembly, in this instance a roller bearing assembly 75 by which the inner end of the wheel support is rotatably mounted on the shaft 17.

In FIGURES 6–8 an arrangement is disclosed in which the wheel 12' is mounted corotatably on the housing 18' of the motor 15' with the shaft 17' attached in a non-rotating manner to the running gear frame of the associated vehicle, and in this instance in such a manner as to permit steering of the wheel. To this end, the shaft 17' is attached to or has formed integrally therewith a steering knuckle bracket 77 adapted to be attached by means of a pin 78 to a frame member 79 and having attached thereto a steering arm 80 to which is suitably pivotally connected a steering link 81. Suitable ports 82 and 83 open through the knuckle member 77 and communicate with respectively the shaft passages 35' and 37' to connect the motor operatively with the operating hydraulic circuit on the order of that described in FIGURES 2 and 3. Hydraulic fluid circulated through the ports 40' and 42' through the eccentric 32' drives the pistons 34' in their cylinders 19' to act upon the bearing block 31' and the housing 18' to drive the housing rotatably on its bearings 30' and 31' about the shaft 17'.

In order to attach the wheel 12' directly to the housing 18' the rim 14' of the wheel in encompassing relation about the housing has attachment lug flange structure 47' thereon secured as by means of lug bolts 84 to radially outwardly extending attachment flanges or lugs 85 on the housing between the circumferentially spaced radially projecting cylinders 19'. Through this arrangement, the wheel 12 is corotatably mounted on the housing 18'.

Either or a combination of above center and below center brake means may be provided for either direct braking control or parking and emergency braking control, although ordinarily hydraulic dynamic braking may be effected while the hydraulic system is functioning. To this end, the housing 18' may be provided with an inward combination hub and brake drum extension 87 with which an external friction brake 88 suitably mounted on or in association with the steering knuckle member 77 is operably engageable. An internal brake arrangement includes an expansible friction brake 89 also mounted on the steering knuckle member 77 and engaging with a brake drum extension 90 attached to the housing 18' as for example by means of the bolts 84, substantially as shown.

Figure 9:
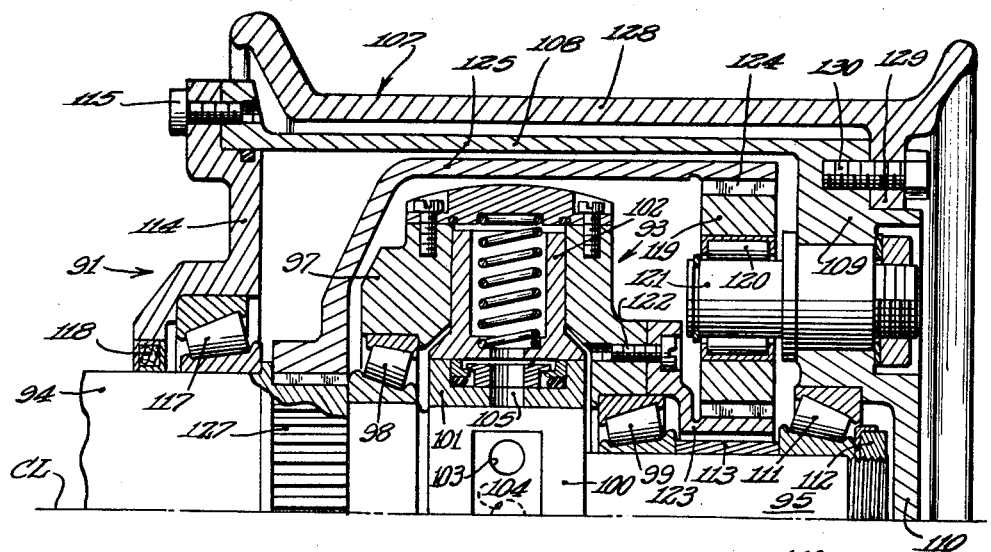
FIGURE 9 is a fragmentary longitudinal sectional view through another modification of the direct drive wheel and mount therefor.
Figure 10:
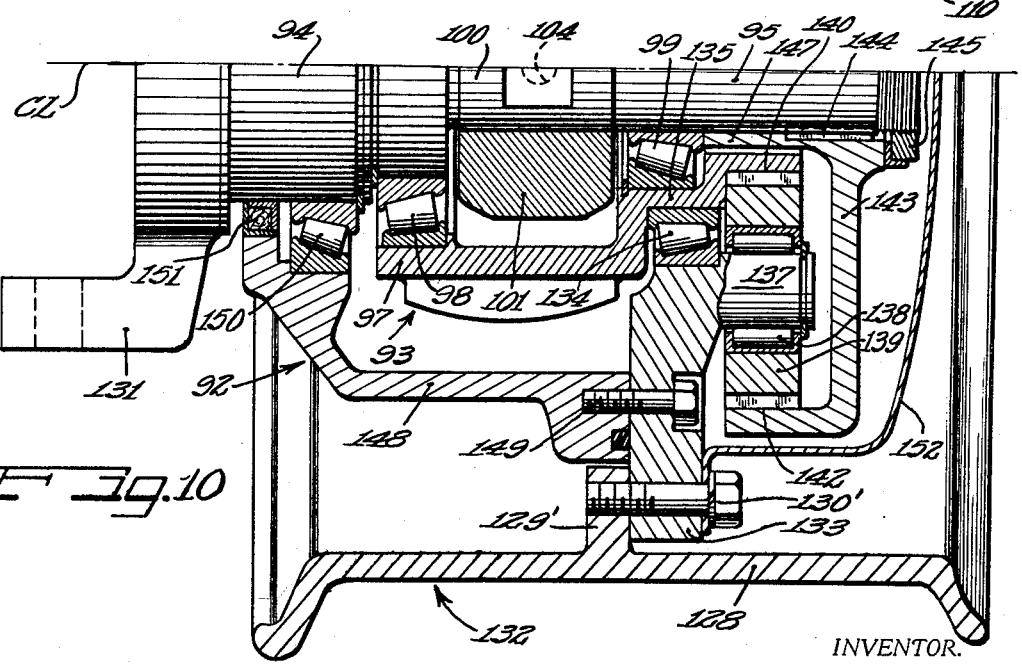
FIGURE 10 is a longitudinal sectional view of still another modification.

In the modification of FIGURES 9 and 10 arrangements of the combination wheel mount and hydraulic wheel driving motor are provided in which respective planetary gear transmissions are located at the outer sides of the motors and the motors are thus nearer the inner side of the wheel in each instance near the mounting end portion of the shaft. For illustrative convenience, and because these two versions of the invention are in numerous respect similar, they are depicted as though separated along a longitudinal center line CL and comprising the upper half of a combination wheel mount and hydraulic wheel driving motor 91 in FIGURE 9 and the lower half of a combination wheel mount and hydraulic wheel driving motor 92 in FIGURE 10. In both of the assemblies 91 and 92 a substantially similar high torque radial piston hydraulic motor 93 is employed and of generally the same constructional and operational characteristics as the hydraulic motor 15 of FIGURES 4 and 5.

Referring now to the specific details of construction of the assembly 91, a combination wheel axle and motor shaft 94 is constructed and arranged to be mounted at its inner end portion to the frame of an associated apparatus, vehicle, or the like, in a manner to retain the shaft against rotation about its axis. Between its inner, maximum diameter butt end portion and an outer reduced axle end portion 95, the shaft rotatably supports the self-propelling motor 93 which comprises a housing 97 carried on axially spaced annular bearing assemblies 98 and 99 about the shaft and on respectively opposite sides of an integral eccentric 100 on the shaft journalled through a follower bearing block 101 against which driving pistons 102 thrust responsive to pressure fluid circulated thereto through respective ports 103 and 104 affording communication through the eccentric 100 from a passage system in the shaft 94 and by way of ports 105 in the faces of the block 101 with the pistons.

As the motor 93 propels itself about the shaft 94, it rotatably drives a wheel assembly 107 concentrically encompassing the same and comprising an annular flanged axially extending hollow wheel mounting housing member 108 having an outer end radially extending flange portion 109 not only providing a wheel hub but also an end closure 110. Rotary support for the flange 109 along the axle portion 95 and retained by nut 112 provided onto the axle extremity and thrusting the inner bearing race against a spacer ring 113 which engages and retains the inner spacer ring of the bearing 99. On its inner end, the generally cup-shaped member 108 is telescopically assembled with a combination bearing seat and closure flange 114 attached thereto removably as by means of screws 115 and mounted on and enclosing a bearing assembly 117, with a dust seal 118 between the inner edge of the flange 114 and the shaft protecting the bearing.

A planetary transmission between the motor 93 and the wheel 107 is provided by means of a set of planet spur gears 119 mounted in anti-friction relation through bearings 120 on respective stub axles 121 mounted on and projecting inwardly from the mounting member flange 109. Attached as by means of screws 122 to the adjacent side of the motor housing 97 is an external ring gear 123 which extends into closely radially spaced relation to the spacer 112 and meshes with the planet gears 119 to drive the same rotatably. Thereby the planet gears 119 are caused to run within a fixed internal ring gear 124 carried on a mounting flange 125 which in this instance encompasses the motor 93 in spaced relation between the motor housing and the wheel mount member 108 and is keyed to a splined 127 on the shaft 94 adjacent to the inner side of the motor.

Removably mounted corotatably on the wheel mount member 108 is a rim 128 such as a tire rim in encircling encompassing relation and having adjacent to its outer end a radially inwardly extending attachment lug structure 129 secured as by means of screws 130 to the outer end of the flange 109.

In FIGURE 10, the assembly 92 is in many respects the same as the assembly 91 and identical reference numerals applied to elements thereof indicates substantial similarity to and have reference to the description of the corresponding elements of the assembly 91. In this instance, the shaft 94 is depicted as having integral therewith steering shackle or knuckle means 131 from which the butt end portion of the shaft 94 projects outwardly. To accommodate the steering shackle, an axially more compact arrangement of a wheel assembly 132 on the shaft 94 about the motor 93 is provided and herein comprising an annular wheel mounting flange 133 to the outer marginal portion of which is adapted to be corotatably secured the tire rim 128 on which the radially inwardly extending mounting lug structure 129' is located more centrally for this purpose for attachment by means of the screws 130'. At its inner edge the flange 133 is rotatably mounted by an annular bearing assembly 134 on an integral axially outwardly extending bearing flange 135 projecting from the motor housing 97 and within which the motor housing mounting bearing 99 is engaged.

In this instance the mounting flange 133 also serves as a planet carrier and economically is provided with integral planet stub axles 137 about which are carried anti-friction bearings 138 on which respective planet spur gears 139 are mounted for rotation about the axles. Transmission connection between the spur gears 139 and the motor housing 97 is effected by means of an axially outwardly extending external gear 140 provided as an integral axially outward step extension from the flange 135. As the planet gears 139 are driven they run in a fixed internal ring gear 142 extending axially inwardly thereabout on a flange 143 which is secured as by means of a key 144 to the axle portion 95 of the shaft and retained by nut 145 which drives an axially inward extension 147 against the inner race of the motor housing bearing 99. Thereby the wheel 132 is driven in the desired differential speed ratio by the motor 93.

For stabilizing the motor mount, an annular generally axially extending stabilizing flange member 148 encompassing the motor 93 is attached at its front end as by means of screws 149 to the flange 133 and has an inner end portion engaged on an annular bearing assembly 150 affording an anti-friction rotary connection with the stub portion of the shaft 94, with a dust seal 151 protecting the bearing. Desirably a protective hub cap 152 is secured across the front end of the wheel assembly as by means of the screws 130' attaching it to the flange 133.

From the foregoing it will be apparent that the present invention provides an advantageous hydraulic drive for wheels in general, and is especially useful for heavy duty purposes such as, but not limited to, the running gear wheels of fork lift trucks, and the like, affording excellent maneuverability, superior speed and inching control, dynamic braking using the hydraulic motor as a pump and thereby eliminating need for service brakes other than for shut-down holding, parking and emergency. It also provides simplified driving train mechanism, easier servicing, simple steering capability, readily adjustable wheel rim and tread arrangements and particularly enabling wider treads for greater stability on rough terrain. Further, the invention affords an efficient wheel drive in the extremely limited space afforded within or in association with the wheels, and which is especially desirable in, and in relation to, the wheels adjacent to the vertical uprights for lift truck fork mechanism which must be located very close to the adjacent wheels and axles.

It may also be noted that in the several forms of the invention exemplified herein all of the motor and wheel mounting parts are readily assembled from the outer, axle end portion of the shaft which affords not only original manufacturing efficiency but also facilitates servicing. Inasmuch as the shaft does not turn, but the motor and the wheel rotate thereabout, the mechanical components can be statically balanced with ease and efficiency, and the motor can therefore be operated at fairly high r.p.m. without need for counterweighting.

It will be understood that variations and modifications may be effected without departing from the spirit and scope of the novel concepts of this invention.

I claim as my invention:

1. A combination vehicle wheel mount and wheel driving motor assembly, comprising:
   a shaft;
   a motor housing;
   means relatively rotatably mounting said housing about said shaft;
   driving means acting upon and between said housing and said shaft to effect relative rotation of the housing and shaft;
   a wheel mounting flange structure rotatably mounted on the shaft and rotatable relative to said housing;
   transmission means operatively connecting said flange structure and said housing and driving said flange structure at a speed differential relative to the relative speed of rotation effected between the housing and the shaft by said driving means;
   said transmission means comprising a planetary gear assembly including respective ring gears rigid with the flange structure and the shaft, and planet spur gears carried by said housing.

2. An assembly according to claim 1, said ring gears being internal gears.

3. An assembly according to claim 1, said ring gears being external gears.

4. A combination vehicle wheel mount and wheel driving motor assembly, comprising:
   a shaft;
   a motor housing;
   means relatively rotatably mounting said housing about said shaft;
   driving means acting upon and between said housing and said shaft to effect relative rotation of the housing and shaft;
   a wheel mounting flange structure rotatably mounted on the shaft and rotatable relative to said housing;
   transmission means operatively connecting said flange structure and said housing and driving said flange structure at a speed differential relative to the relative speed of rotation effected between the housing and the shaft by said driving means;
   said transmission means comprising a planetary gear assembly including an external ring gear on said housing, an internal ring gear rigid with said shaft, and planet gears meshing with the ring gears and carried by said flange structure.

References Cited

UNITED STATES PATENTS

| | | | |
|---|---|---|---|
| 3,439,766 | 4/1969 | Dence et al. | 180—66 |
| 640,284 | 1/1900 | Hill. | |
| 3,179,016 | 4/1965 | Thornton-Trump. | |
| 1,642,103 | 9/1927 | Daubenmeyer | 180—66 |
| 2,353,730 | 7/1944 | Joy | 180—66 |
| 2,355,604 | 8/1944 | Rupp | 180—66 |
| 2,418,123 | 4/1947 | Joy | 180—66 |
| 3,036,557 | 5/1962 | Kimsey | 91—176 |
| 3,217,826 | 11/1965 | Carter et al. | 180—66 X |
| 3,302,741 | 2/1967 | Brazuk | 180—66 X |

FOREIGN PATENTS

| | | |
|---|---|---|
| 693,374 | 7/1953 | Great Britain. |
| 915,658 | 1/1963 | Great Britain. |

LEO FRIAGLIA, Primary Examiner

M. L. SMITH, Assistant Examiner

U.S. Cl. X.R.

60—53; 180—66